E. B. MOSELEY.
FILING APPLIANCE.
APPLICATION FILED MAR. 23, 1912.

1,170,775.

Patented Feb. 8, 1916.
3 SHEETS—SHEET 1.

WITNESSES:
J. H. Gardner.
G. M. Mapes.

INVENTOR:
Emerson B. Moseley,
BY E. T. Silvius,
ATTORNEY.

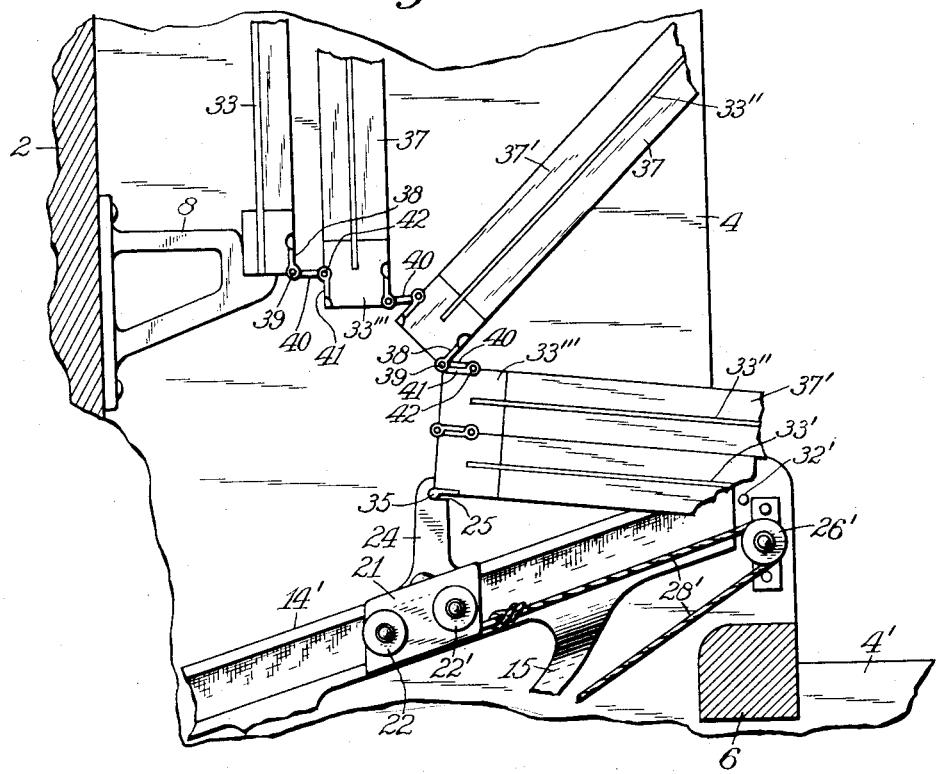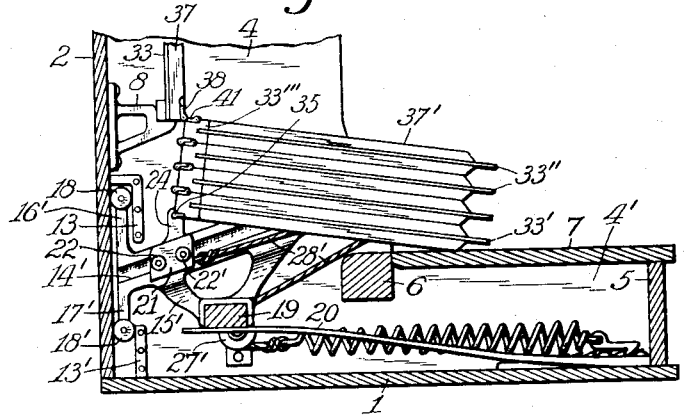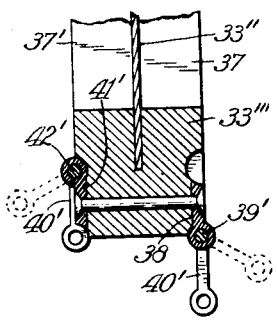

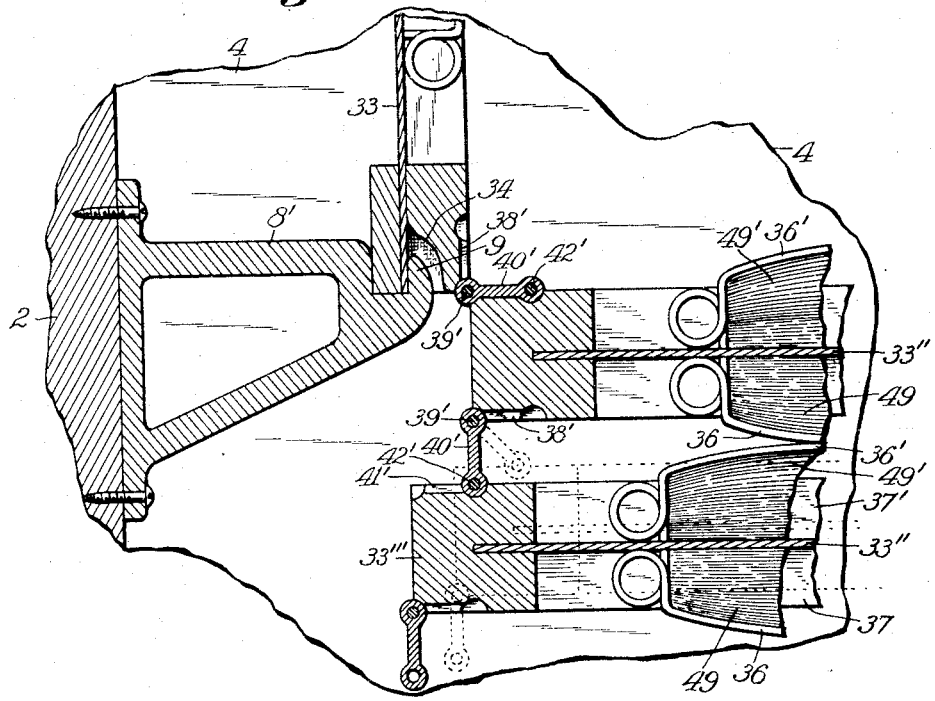
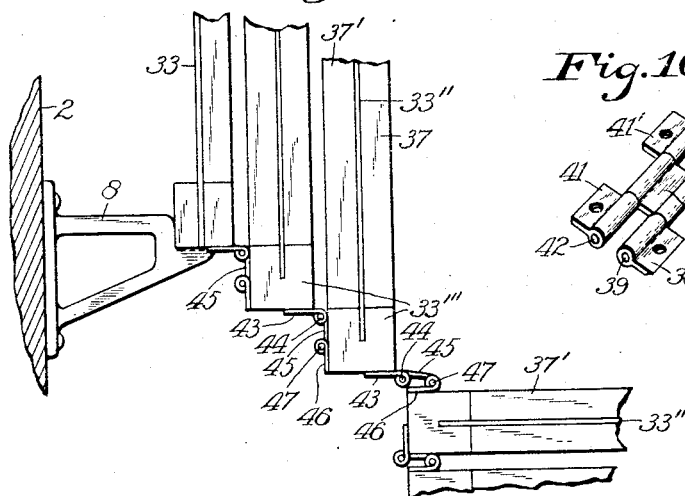
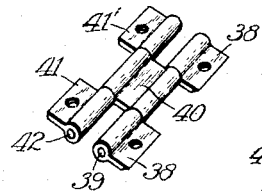
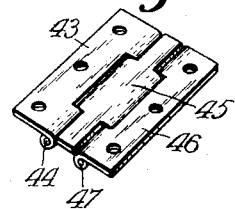

UNITED STATES PATENT OFFICE.

EMERSON B. MOSELEY, OF ALLIANCE, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,170,775.   Specification of Letters Patent.   Patented Feb. 8, 1916.

Original application filed November 30, 1910, Serial No. 594,817. Divided and this application filed March 23, 1912. Serial No. 685,898.

*To all whom it may concern:*

Be it known that I, EMERSON B. MOSELEY, a citizen of the United States, residing at Alliance, in the county of Stark and State of Ohio, have invented a new and useful Filing Appliance, of which the following is a specification, reference being had to the accompanying drawings and to the letters and figures of reference marked thereon.

This invention relates to leaves or frames that are designed to be mounted in a suitable case to constitute a cabinet in which to file papers of various kinds for future reference, more particularly duplicate bill slips used in credit accounting systems, the invention having reference more particularly to supporting and connecting devices for the leaves or frames illustrated and described but not claimed in my pending application for Letters Patent, filed November 30, 1910, Serial No. 594,817, of which this is a divisional application for Letters Patent.

The principal object of the invention is to provide improved hinging devices for leaves or frames of the above-mentioned character that will permit the leaves to stand apart when overcrowded with papers or bill slips, and at the same time permit the leaves to be in echelon or stepped relation one to another, when in normal upright position in the supporting case, a further object being to provide improved construction in filing appliances of the above-mentioned character that may be cheaply produced and which shall be reliable, durable and economical in use.

The invention consists in filing appliances comprising leaves or frames adapted to be suitably supported and provided with novel hinging connections which permit the leaves to be stepped adjustably, and permit that they also be freely operated when over crowded with papers; and the invention consists also in the parts, and in the combinations and arrangements of parts, as hereinafter particularly described and claimed.

Figure 1:
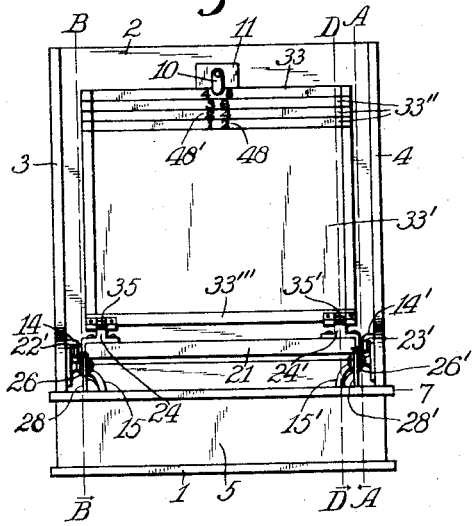
Figure 2:
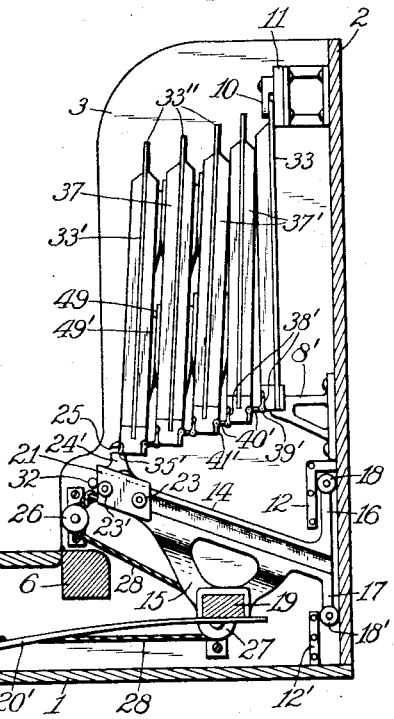
Figure 3:
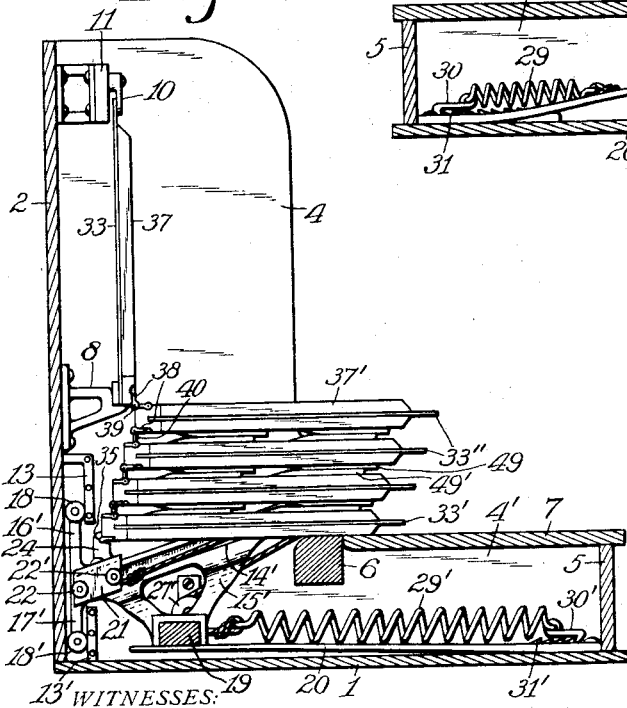
Figure 4:
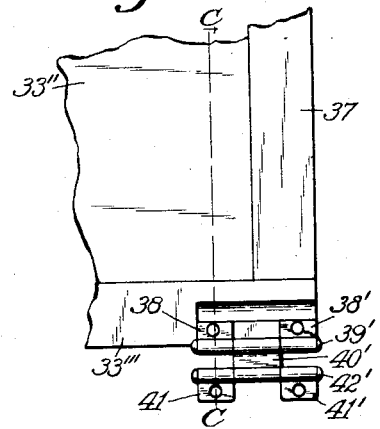

Referring to the drawings, Figure 1 is a front elevation of a filing cabinet constructed substantially in accordance with the invention; Fig. 2, a vertical section approximately on the line A A in Fig. 1; Fig. 3, a vertical section approximately on the line B B in Fig. 1, with some of the leaves in prone position; Fig. 4, a fragmentary elevation of one of the filing leaves or frames; Fig. 5, a fragmentary section on an enlarged scale as at the plane of the line B B in Fig. 1, showing the leaves or frames in various positions; Fig. 6, a fragmentary section also on the line B B with some of the leaves in prone position close together; Fig. 7, a fragmentary section on the line C C in Fig. 4; Fig. 8, a fragmentary section on an enlarged scale, on the line D D in Fig. 1; Fig. 9, a fragmentary side elevation showing a number of leaves or frames connected together with slightly modified hinging devices; Fig. 10, a perspective view of one of the hinges that are employed when it is desired that the connected ends of the leaves shall lie or stand close together when not crowded apart by papers thereon, and Fig. 11, a perspective view of one of the hinges which may be employed when it is desired that the connected ends shall stand slightly apart at all times.

In the different figures of the drawings similar reference characters indicate corresponding elements or features of construction herein referred to and described.

A case in which the filing leaves or frames are suitably mounted may vary as may be desired, a suitable case comprising a bottom 1, relatively high back 2 and sides 3 and 4 on the rearward portion of the bottom, relatively low sides 3' and 4' extending from the higher sides and forward to a front 5 on the forward end of the bottom. A rail or shelf 6 extends across between the lower portions of the higher sides at a suitable distance above the bottom 1, and a lid 7 is arranged upon the side portions 3' and 4'. A pair of hook-like leaf supports 8 and 8' are mounted on the inner side of the back 2, each support having an upwardly extending projection 9 on its forward portion whereby to retain the rearmost one of the leaves when in the case, and a fastening button or device 10 is movably connected with the back 2, being preferably mounted on a base-block 11, for holding the upper end of the rearmost leaf in normal position. A pair of upright guide-bars 12 and 12' are mounted fixedly in the case adjacent to the back 2 and side 3, and similar guide-bars 13 and 13' are mounted also in the case adjacent to the back 2 and side 4, the guides being spaced a suitable distance from the back. A pair of guides 14 and 14' provided with frame members 15 and 15' are designed to be supported in an inclined plane and have upwardly extending acute angled arms 16 and 16' and downwardly extending obtuse-angled arms 17 and 17' thereon provided with anti-friction rollers 18 and 18' which operate between the back 2 and the upright guide bars. The frame members are suitably secured to a cross-bar 19 which is normally pressed upward by a pair of springs 20 and 20', or one spring, mounted on the bottom 1. A cross-head 21 is provided which extends from one to the other of the guides 14 and 14', one end of the cross-head having rollers 22, 22', in contact with one of the guides, the other end having similar rollers 23, 23', in contact with the other guide. A pair of pivot bearings 24 and 24' are mounted on the cross-head and each one has a slot 25 in its forward side to receive a pivot of the foremost leaf. A pair of guide sheaves 26 and 26' are mounted above the rail 6, preferably on the sides 3 and 4, and two guide sheaves 27 and 27' are mounted suitably near the rearward portion of the bottom 1, and two cords 28 and 28' extend over the guide sheaves and are connected to the cross-head and also to springs 29 and 29', respectively, which are provided with hooks 30, 30', adapted to engage teeth 31, 31', with which the bottom 1 is provided for regulating the tension of the springs which are adapted to normally pull the cross-head forward. The cross-head is stopped in its forward movement preferably by means of stop-pins 32, 32', mounted on the sides 3 and 4 of the case.

A suitable number of bill holding leaves or frames are provided and suitably assembled, there being illustrated a rear leaf 33, a front leaf 33', and intermediate leaves 33'', the normal lower end of each leaf being suitably thickened by means of a hinge-bar 33'''. The lower end of the rear leaf has recesses 34 therein to receive the hook-like supports 8 and 8', and the lower forward side of the front leaf is provided with a pair of pivots 35, 35', adapted to be placed in the slots or recesses 25 of the pivot-bearings. The leaves are suitably provided as usual with bill-holding clamps 36, 36', or otherwise adapted to hold sheets of paper on the leaves; also as customary, the leaves proper are provided with rubbing strips 37, 37', which hold the leaves apart a desired distance. The devices for connecting the leaves together may be variously constructed in detail, and when it is desired that the leaves shall be permitted to lie close together the forward side of each intermediate leaf and the rearmost leaf are provided with two pairs of hinge plates 38 and 38', the pairs supporting hinge-pins 39 and 39' in the plane of the forward side of the leaf at the lower end thereof, two links 40 and 40' being pivotally connected at one end to the hinge-pins, respectively. The rear side of the front leaf and intermediate leaves are provided each with two pairs of hinge-plates 41, 41', to which are connected hinge-pins 42, 42', which are held on the plane of the rear side of the leaf. The planes of the forward and rear sides of the leaves should be understood as referring to the forward and rear sides of the hinge-bars and rubbing strips which determine the minimum amount of space occupied by each leaf. The hinge-pins 42 and 42' are situated at a suitable distance above the lower ends of the leaves and are connected to the links 40 and 40'. The links being arranged between two hinge-plates permit the leaves to be moved close together, it being understood that the hinge-plates are set in flush with the faces of the leaves. When it is desired to so connect a plurality of leaves of pre-determined thickness, so that there shall be some space between the leaves to accommodate a relatively larger number of sheets of paper, the hinges are constructed substantially as shown in Figs. 9 and 11 and connected to the leaves as illustrated in Fig. 9, each hinge comprising a plate 43 which is secured to the under side of the leaf and supports a hinge-pin 44 slightly beyond the plane of the front of the leaf, a link 45 being connected to the pivot-pin. The rear sides of the leaves have hinge-plates 46 secured thereto which support hinge-pins 47 slightly rearward of the plane of the leaf and connected to the links. The upper forward sides of the leaves are provided with indexing characters 48, 48', as usual.

The numerals 49, 49', indicate packs of bill-slips secured to the leaves and being of unusually large quantities force the leaves apart to accommodate them.

In practical use papers or bill-slips requiring to be preserved in systematic order are placed on the leaves or frames and secured thereto by the spring clamps or such devices as may be provided. The set of leaves being mounted in the case substantially as illustrated, when it is desired to gain access to any one of the leaves the desired leaf or one next in front of it with all the leaves forward thereof may be moved forward to prone position by hand, the indexing on the leaves being visible to the operator. When pulling the leaves forward the front leaf forces the cross-head 21 rearward and downward as the leaf or leaves move forward pivotally thereon. The rearmost one of the leaves that are being moved forward moves relatively to the adjacent normally positioned leaf both pivotally and upward, since the leaves that are being moved forward are forced uprightly by means of the springs 20, 20', acting through the cross-head and connections. It will be seen, therefore, that when the leaves are in prone position they are formed in a rectangular pack and closely excepting when some or all of them are forced apart by unusual quantities of papers filed thereon. When the leaves are lifted from prone position the action of the springs 29, 29', forces the cross-head forward so as to assist in returning the leaves to normal position and then normally holds them uprightly.

Having thus described the invention, what is claimed as new, is—

1. A filing appliance including a plurality of recessed filing leaves, and folding devices extending into the recesses and connecting the leaves together hingedly and also with a movement of separation each with respect to the adjacent one.

2. A filing appliance including a plurality of recessed filing leaves, and foldable hinges connecting the leaves together and folding into the recesses, each hinge having two hinge-pins and a link connected thereto.

3. A filing appliance including a plurality of leaves, devices on the leaves for holding papers thereon, and hinging devices comprising interfolding plates between the leaves connecting each two adjacent leaves together and pivoted thereto at different distances from the ends thereof.

4. A filing appliance including a plurality of recessed leaves, bill-holding devices on the leaves, and a plurality of hinges comprising each a link and two hinge-plates pivotally connected thereto, one of the hinge-plates being secured to one and the other to an adjacent one of the leaves in the recess thereof.

5. A filing appliance including a plurality of assembled upright filing leaves having each a hinge-pin on the lower forward portion thereof, the leaves having also a hinge-pin on the rear or opposite side above the lower end thereof, and a link connected pivotally to the two hinge-pins of adjacent leaves.

6. A filing appliance including a plurality of uprightly collocated bill-holding leaves, each leaf having a plurality of pairs of hinge-plates on opposite facing sides thereof, and a plurality of links, each link pivotally connected to and between the two of a pair of the hinge-plates on one side of one leaf and also to and between the two of a pair of the hinge-plates on the opposite side of an adjacent leaf.

7. In a filing appliance, the combination of a plurality of leaves arranged face to face and normally in upright position, the rearmost one of the leaves having recesses in the lower end thereof, to receive supporting devices, the foremost one of the leaves having supporting pivots on the forward portion of the lower end thereof, and links connecting the lower ends of the leaves together.

8. In a filing compliance, the combination of a plurality of leaves arranged face to face and normally in upright position, each one of the leaves having pivots on the forward portion of the lower end thereof, the rearmost one of the leaves having recesses in the lower end thereof to receive supporting devices, each leaf excepting the rearmost one having pivots on the rearward side at a distance from the lower end thereof, and links connected at one end to the pivots that are on the rearward portion of the leaves and connected at their opposite end to the pivots that are on the forward portion of adjacent leaves.

9. In a filing appliance, the combination with a plurality of filing frames normally arranged uprightly face to face, of a plurality of hinge plates, and a plurality of links, each link being pivotally connected at opposite ends respectively to two of the hinge plates, one hinge plate being secured to one leaf and supporting the link that is connected thereto at the lower end of the leaf, the remaining hinge plate being secured to an adjacent leaf and supporting the leaf at a point above the lower end thereof by means of the pivotal connection with the link.

10. In a filing appliance, the combination of a plurality of uprightly collocated filing leaves, with means for supporting the rear one of the leaves, and a plurality of series of connections between the normal lower portions of the leaves respectively, the connections including devices enabling the leaves to be moved forward pivotally to prone position and in prone position toward or from adjacent leaves.

11. In a filing appliance, the combination of a plurality of uprightly collocated filing leaves, with means for supporting the rear one of the leaves, and means for connecting the normal lower portions of the leaves together, the connecting means including devices enabling the leaves to be swingingly moved forward to prone position and each rearward to a position of alinement with the next adjacent upper one of the leaves.

12. In a filing appliance, a plurality of collocated filing leaves provided with foldable connecting devices for relative swinging movement of the leaves, each device being connected to adjacent sides of adjacent leaves at different distances from the ends thereof.

13. In a filing appliance, a plurality of collocated filing leaves provided with foldable connecting devices for relative swinging movement of the leaves, each device being connected to one end of one of the leaves and also to the next adjacent one of the leaves at a distance from its corresponding end.

14. In a filing appliance, the combination with a plurality of upright collocated filing leaves, and means for supporting the rear one of the leaves, of a plurality of connecting devices for the leaves, each device being connected to one of the leaves for relative swinging movement and connected also to the next adjacent one of the leaves for swinging movement of the latter relative to the device the connections with adjacent leaves being at different distances from the ends thereof.

In testimony whereof, I affix my signature in presence of two witnesses, on the 13th day of March, 1912.

EMERSON B. MOSELY.

Witnesses:
　HENRY FRANCIS POLLOCK,
　GAIL A. RUTTER.

Copies of this patent may be obtained for five cents each, by addressing the "Commissioner of Patents, Washington, D. C."